United States Patent [19]
Ban et al.

[11] Patent Number: 5,743,467
[45] Date of Patent: Apr. 28, 1998

[54] AUTOMOBILE HEATING SYSTEM

[75] Inventors: Takashi Ban; Hidefumi Mori; Kiyoshi Yagi, all of Kariya, Japan

[73] Assignee: Kabushiki Kaisha Toyoda Jidoshokki Seisakusho, Kariya, Japan

[21] Appl. No.: 747,317

[22] Filed: Nov. 12, 1996

[30] Foreign Application Priority Data

Nov. 13, 1995 [JP] Japan .................................. 7-294507

[51] Int. Cl.⁶ ........................................................ B60H 1/02
[52] U.S. Cl. ........................................ 237/12.3 R; 122/26
[58] Field of Search ...................... 237/12.3 R; 122/26; 126/247

[56] References Cited

U.S. PATENT DOCUMENTS

| | | |
|---|---|---|
| 4,197,712 | 4/1980 | Zwick et al. .................................. 62/53 |
| 4,993,377 | 2/1991 | Itakura . |
| 5,230,326 | 7/1993 | Suzuki et al. .............................. 126/247 |
| 5,332,367 | 7/1994 | Suzuki et al. .............................. 417/286 |
| 5,333,679 | 8/1994 | Suzuki et al. .............................. 165/43 |

*Primary Examiner*—Henry A. Bennett
*Assistant Examiner*—Derek S. Boles
*Attorney, Agent, or Firm*—Burgess, Ryan & Wayne

[57] ABSTRACT

An automobile heating system adapted for being incorporated in an automobile climate control system and being mounted on an engine housing within an engine compartment of an automobile without occupying a large space. The automobile heating system may be manufactured at low cost, and satisfactorily heats the passenger cabin of the automobile and enables the engine to quickly warm up after the start of the engine. The automobile heating system is provided with an auxiliary heat source integrally combined with one of the auxiliary machines including an idler, a power steering hydraulic pump or an alternator.

11 Claims, 5 Drawing Sheets

AUTOMOBILE HEATING SYSTEM

BACKGROUND OF THE INVENTION

1. Field of the Invention

The present invention relates to an automobile heating system using the heat of a circulating heat-exchanging liquid medium such as a cooling water, for heating or warming the interior of an automotive body including a passenger cabin of the automobile.

2. Description of the Related Art

A conventional automobile heating system uses an engine housing including a cylinder block, a cylinder head and such. A main heat receiving chamber is formed in the cylinder head and the associated portions. The main heat receiving chamber is fluidly connected to a radiator and a heater core by a conduit which is opened and closed by a thermostat device. A cooling water is circulated through the main heat receiving chamber, liquid conduits, the radiator and the heater core by a water pump.

The cooling water removes heat from the operating engine to cool the latter, and is in turn heated. The heat of the cooling water is then supplied to the heater core to warm the interior of an automotive body, e.g., a passenger cabin. When the cooling water is excessively heated by the heat of the engine, the thermostat opens the conduit to deliver the cooling water to the radiator for cooling.

Automotive auxiliary machines such as an idler pulley, a hydraulic pump for power steering, and an alternator are fixedly mounted on the engine housing. Pulleys of the respective automotive auxiliary machines are connected by belts to a crankshaft pulley of the engine so as to be driven by the engine.

The conventional automobile heating system relies only on the heat provided by the engine to warm the air of the passenger cabin and hence, the automobile heating system cannot heat the passenger cabin satisfactorily for some time period subsequent to the start of the engine and particularly in cold districts.

Combustion cannot take place properly in the engine before the engine warms up to a certain extent even if the conduit is closed by the thermostat to warm up the engine by the heat provided by the engine and, therefore, the engine is unable to operate at a satisfactory combustion efficiency and discharges a polluting exhaust gas.

However, the size of an engine unit including the engine per se is enlarged inevitably, if an auxiliary heat source is disposed in the engine compartment, and the use of the auxiliary heat source requires an additional space for installation and additional parts including a pulley and a driving shaft, increasing the manufacturing cost of the automobile. Thus, it is requested to solve the foregoing problems encountered by the conventional automobile heating system.

SUMMARY OF THE INVENTION

Accordingly, it is an object of the present invention to provide an inexpensive automobile heating system not requiring a very large space for installation in an engine compartment.

Another object of the present invention is to provide an automobile heating system capable of satisfactorily warming the interior of the automotive body of an automobile after the start of the engine thereof and of enabling the engine to be warmed up quickly.

According to the present invention, an automobile heating system for an automobile comprises an engine housing having a main heat receiving chamber, an auxiliary machine having a machine housing, a shaft and a pulley, and driven by the engine of the automobile, a radiator, a conduit connecting the main heat receiving chamber to the radiator, a thermostat for opening and closing the conduit, and a heater core. The main heat receiving chamber, the conduit, the radiator and the heater core are arranged so that the cooling water circulates therethrough.

The engine housing is provided with a separate auxiliary heat source including a heater housing provided with a heat generating chamber and an auxiliary heat receiving chamber contiguous with the heat generating chamber and a heater driving shaft supported for rotation on the heater housing, and capable of making a viscous fluid generate heat to supply heat to the cooling water flowing through the auxiliary heat receiving chamber, and the auxiliary machine and the auxiliary heat source are integrated in an assembly so that the machine housing also serves as the heater housing and/or the shaft of the auxiliary machine serves as the heater driving shaft.

In the automobile heating system, the auxiliary machine functions and drives the auxiliary heat source when the shaft of the auxiliary machine is driven through a pulley by the engine and, consequently, the viscous fluid generates heat. The heat generated by the viscous fluid is transferred to the cooling water flowing through the auxiliary heat receiving chamber, and the circulating heat thus heated circulates through the conduit and the heater core to heat the passenger cabin by both the heat generated by the engine and the heat generated by the auxiliary heat source. Accordingly, the automobile heating system is able to satisfactorily heat the passenger cabin immediately after the start of the engine even in cold districts.

In this automobile heating system, the cooling water heated by the heat generated by the auxiliary heat source flows through the main heat receiving chamber. Consequently, the engine is heated by its own heat and the heat generated by the auxiliary heat source, so that the engine can warm up quickly to ensure satisfactory combustion. Thus, the automobile heating system exercises excellent effects on maintaining satisfactory combustion efficiency and preventing the discharge of a polluting exhaust gas. After the engine has warmed up and the engine has become able to maintain an appropriate engine temperature by its own heat, the thermostat opens the conduit to cool the circulating conduit by the radiator so that the engine is not excessively heated. Preferably, the auxiliary heat source is of a variable capacity type.

In the automobile heating system, the machine housing of the auxiliary machine serves also as a heater housing, and the shaft of the machine can function as a heater drive shaft. Since the auxiliary machine and the auxiliary heat source (viscous heater) are combined integrally in an assembly, the size of an engine unit including the engine per se is not enlarged to an intolerable extent, the auxiliary machine and the auxiliary heat source need not be provided pulleys and such individually and hence the number of parts is not increased. Therefore, the automobile heating system does not occupy a very large space in the engine compartment and can be manufactured at low cost.

When the auxiliary heat source of the automobile heating system is of a variable capacity type, the heat generating ability of the auxiliary heat source may be reduced after the heat generating performance of the engine has increased to supply heat sufficient for heating the passenger cabin and maintaining itself at an appropriate engine temperature.

Therefore, the cooling of the cooling water by the radiator and the resultant cooling of the engine can be achieved without trouble. Accordingly, the automobile heating system can prevent the overheating of the engine. The automobile heating system can more easily be mounted on the automobile when the auxiliary heat source is combined integrally with the auxiliary machine provided with the pulley thereof driven continuously while the engine is in operation than when the auxiliary heat source is combined integrally with an auxiliary machine provided with an electromagnetic clutch having an axial dimension greater than that of the pulley.

In the automobile heating system, the heater core may be connected to the conduit at a position above the thermostat with respect to the flowing direction of the cooling water.

When the heater core is thus connected to the conduit, the auxiliary heat source can heat the cooling water flowing at a low flow rate while the cooling water is cold and the conduit is closed by the thermostat. Therefore, the automobile heating system can heat the passenger cabin of an automobile quickly, and the engine is able to quickly warm up after the start of the engine.

A bypass conduit bypassing the auxiliary heat receiving chamber may be connected to the conduit for urging the cooling water to flow through the auxiliary heat receiving chamber and the bypass conduit. In this case, since the cooling water heated by the heat generated by the engine flows through the bypass conduit and bypasses the auxiliary heat receiving chamber, the load on the water pump can be reduced.

The auxiliary machine incorporating therein the auxiliary heat source may be an idler. The idler serving as the auxiliary machine may include an arm supported for swing motion on the engine housing, an idler shaft supported for rotation in a bearing on the arm, and an idler pulley fixedly mounted on the idler shaft. The idler tightens the belt to a fixed tension or guides the belt engaging with the pulley of other auxiliary machines to stabilize the torque. The idler takes most of the volume of the idler and a mounting space can relatively easily available in the vicinity of the idler. Therefore, when the idler is used to incorporate the auxiliary heat source, the idler shaft can be also used as the heater drive shaft if the heater housing is supported so as to swing relative to the engine housing. The automobile heating system thus constructed can be easily installed in the engine compartment and can be manufactured at low cost.

Alternately, the hydraulic pump of the power steering system may be employed as the auxiliary machine incorporating therein the auxiliary heat source. When the hydraulic pump is employed to incorporate therein the auxiliary heat source, the latter can be lubricated by the hydraulic fluid pumped by the hydraulic pump and, consequently, the durability of the auxiliary heat source can be improved. When the auxiliary heat source uses the hydraulic fluid pumped by the hydraulic pump as the viscous fluid, the construction of the automobile heating system is simplified and the manufacturing cost of the automobile heating system can be lower.

The alternator may be employed as an auxiliary machine which incorporates the auxiliary heat source therein. The rotating speed of a pulley mounted on the shaft of the alternator is about twice as high as that of the crank pulley. Therefore, the automobile heating system employing the alternator as the auxiliary machine to incorporate the auxiliary heat source can bring its heating ability into full play because the heater drive shaft is driven for high-speed rotation.

BRIEF DESCRIPTION OF THE DRAWINGS

The above and other objects, features, and advantages of the present invention will become more apparent from the ensuing description of the embodiments thereof in conjunction with the accompanying drawings, wherein.

DESCRIPTION OF THE PREFERRED EMBODIMENTS

Figure 1:
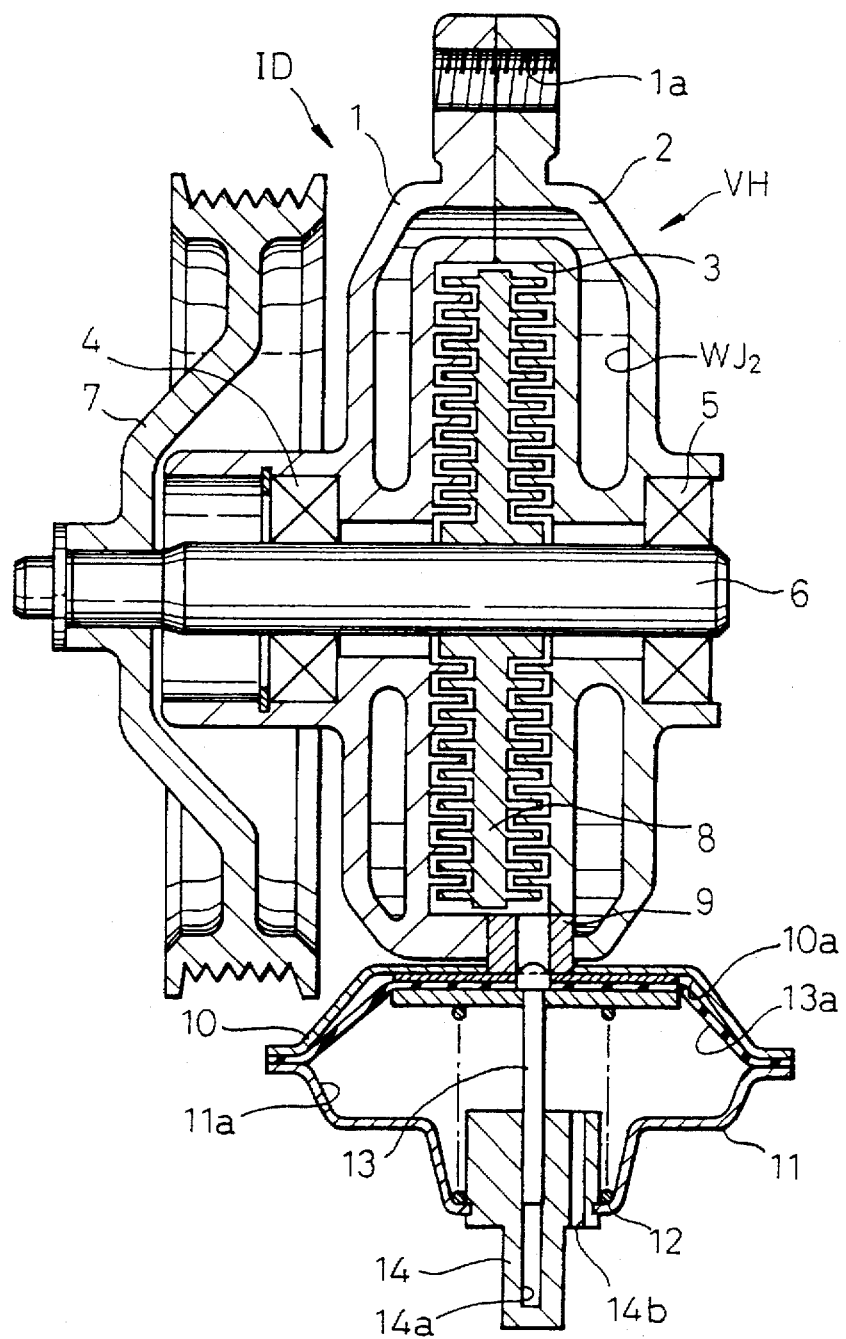
FIG. 1 is a longitudinal sectional view of an essential portion of an automobile heating system according to a first embodiment of the present invention.

Referring to FIG. 1, an automobile heating system according to the first embodiment of the present invention includes a heater housing formed by fastening together a front housing 1 and a rear housing 2. Grooves are formed in the inner surfaces of the front housing 1 and the rear housing 2 to define a labyrinthine heat generating chamber 3. An auxiliary heat receiving chamber WJ2 is formed so as to surround the heat generating chamber 3 in the front housing 1 and the rear housing 2. An inlet port and an outlet port, not shown, are formed in peripheral portions of the front housing 1 and the rear housing 2 so as to open into the auxiliary heat receiving chamber WJ2.

Bearings 4 and 5 are fitted in the bosses of the front housing 1 and the rear housing 2, respectively, and a drive shaft 6 serving as both an idler shaft and a heater driving shaft is supported for rotation in the bearings 4 and 5. An idler pulley 7 is fixedly mounted on the front end of the drive shaft 6, and a rotor 8 is mounted in a press fit on a middle portion of the drive shaft 6. The rotor 8 is provided with grooves in its opposite surfaces and those grooves mate with the grooves of the front housing 1 and the rear housing 2 to form the labyrinthine heat generating chamber 3. The labyrinthine heat generating chamber 3 is filled up with silicone oil, i.e., a viscous fluid.

A pipe 9 connected to a diaphragm case formed by joining together an upper case 10 and a lower case 11 is fixed to lower portions of the front housing 1 and the rear housing 2. A diaphragm 13a held between the upper case 10 and the lower case 11 is always biased upward by a compression spring 12. A guide rod 13 has an upper end connected to the diaphragm 13a. The diaphragm 13a divides the interior of the diaphragm case formed by the upper case 10 and the lower case 11 into an upper control chamber 10a and a lower control pressure chamber 11a. A guide member 14 is fixed to a lower portion of the lower case 11. The guide member 14 is provided with a guide bore 14a for guiding the guide rod 13, and a port 14b through which manifold pressure is applied to the control pressure chamber 11a.

The idler pulley 7, the drive shaft 6, the heater housing formed by fastening together the front housing 1 and the rear housing 2 constitute an idler ID, and the front housing 1, the rear housing 2, the drive shaft 6, the heat generating chamber 3, the rotor 8, the silicone oil and the auxiliary heat receiving jacket WJ2 constitute a viscous heater VH. Thus the viscous heater VH is combined integrally with the idler ID in an assembly, and the front housing 1, the rear housing 2 and the drive shaft 6 serve as the components of both the idler ID and the viscous heater VH. The front housing 1 and the rear housing 2 are provided with through holes 1a to receive a boss formed in the cylinder block of an engine 16 (FIG. 2) and through holes, not shown, to engage with a bracket attached to the cylinder block. The assembly of the idler ID and the viscous heater VH is turned relative to the cylinder block to adjust the position of the same on the cylinder block.

Figure 3:
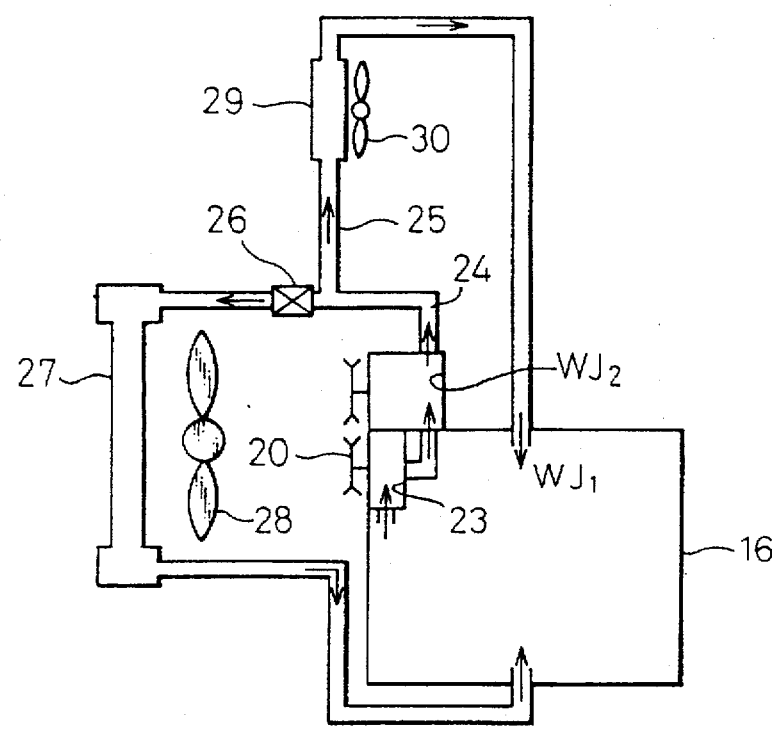
FIG. 3 is a diagrammatic view of the automobile heating systems according to the first, the third and the fourth embodiments of the present invention.

The idler pulley 7, an electromagnetic clutch 18 for an air conditioning system, a power steering pulley 19, a water pump pulley 20 and an alternator pulley 21 are driven through a belt 22 by a crankshaft pulley 17. As shown in FIG. 3, a main heat receiving chamber WJ1 is formed in the cylinder block of the engine 16 and the associated parts. The main heat receiving chamber WJ1 communicates with the inlet port of the viscous heater VH by means of the pump chamber 23 of a water pump driven through the water pump pulley 20. A main conduit 24 forming a passage of the cooling water is connected to the outlet port of the viscous heater VH. An auxiliary fluid conduit 25 also forming a passage of the cooling water is branched from the main conduit 24 at a branching position on the main conduit 24. A thermostat 26 is provided in a portion of the main conduit 24 below the branching position with respect to the flowing direction of the cooling water, and controls the opening and closing of the portion of the main conduit 24 which is connected to an inlet port of a radiator 27 for the engine. Thus, the cooling water is returned from the radiator 27 to the main heat receiving chamber WJ1. An engine cooling fan 28 is disposed opposite to the radiator 27. The auxiliary conduit 25 is connected to a heater core 29. The cooling water supplied to the heater core 29 is returned to the main heat receiving chamber WJ1. A room heating fan 30 is disposed opposite to the heater core 29. The main heat receiving chamber WJ1, the pump chamber 23, the auxiliary heat receiving chamber WJ2, the main conduit 24, the radiator 27, the auxiliary conduit 25 and the heater core 29 contain the cooling water.

The position of the idler ID relative to the cylinder block is adjusted to apply a fixed tension to the belt 22 and to guide the belt 22 in order that torque is stabilized. When the drive shaft 6 is driven through the idler pulley 7 by the engine 16, the rotor 8 of the viscous heater VH rotates in the heat generating chamber 3, while the water pump driven through the water pump pulley 20 by the engine 16 cause the cooling water to flow through the main heat receiving chamber WJ1. The silicone oil filling up the labyrinthine heat generating chamber 3 is sheared to generate heat. The heat generated in the silicone oil is transferred to the cooling water flowing through the auxiliary heat receiving chamber WJ2 and the thus heated cooling water flows through the auxiliary conduit 25 into the heater core 29. Thus both the heat generated by the engine 16 and the heat generated by the viscous heater VH are used for heating the passenger cabin. Therefore, the automobile heating system is able to heat the passenger cabin satisfactorily immediately after the start of the engine 16 even in cold districts.

Since the cooling water heated by the heat generated by the viscous heater VH is circulated through the main heat receiving chamber WJ1 while the engine 16 is cold, the engine 16 is heated by both the heat generated by the engine 16 and the heat generated by the viscous heater VH, whereby the engine 16 is heated quickly to a temperature at which efficient combustion is possible.

Since the automobile heating system heats the cooling water flowing at a low flow rate through the viscous heater VH by the viscous heater VH particularly while the cooling water is cold and the main conduit 24 is closed by the thermostat, the passenger cabin can quickly be heated and the engine 16 is able to warm up quickly after the start of the engine 16.

In an operating mode in which the engine generates heat sufficient to maintain itself at an appropriate temperature, the thermostat 26 opens the main conduit 24 and the cooling water is cooled by the radiator 27 so that the engine 16 is not be heated to an excessively high temperature. In this operating mode, an external control signal is given to apply the manifold pressure to the control pressure chamber 11a, so that the diaphragm 13a is displaced downward against the force of the compression spring 12 to increase the volume of the control chamber 10a. Consequently, the silicone oil is caused to flow, by gravity from the heat generating chamber 3 into the control chamber 10a, so that the heat generating ability of the viscous heater VH is reduced. Accordingly, a problem does not arise in the cooling of the cooling water by the radiator 27 (FIG. 3) and the resultant cooling of the engine 16, and the automobile heating system exercises excellent effects on maintaining satisfactory combustion efficiency and preventing the discharge of a palliating exhaust gas and prevents troubles due to the overheating of the engine 16.

If the engine 16 and the cooling water are cold when the engine 16 is started again, the thermostat 26 closes the main conduit 24 to make the cooling water heated by the heat generated by the viscous heater VH flow through the heater core 29 and the main heat receiving chamber WJ1. In this state, the manifold pressure applied to the pressure control chamber 11a (FIG. 1) is equal to the atmospheric pressure, and the diaphragm 13a is moved to an upper position by the compression spring 12 to reduce the volume of the control chamber 10a. Consequently, the silicone oil flows from the control cheer 10a into the heat generating chamber 3 to restore the full heat generating ability of the viscous heater VH.

Since the automobile heating system has the idler ID having the idler pulley 7 of a relatively short axial length, and the viscous heater VH integrally combined with the idler ID in an assembly, uses the drive shaft 6 as both an idler shaft and a heater driving shaft, and the front housing 1 and the rear housing 2 serve as both the components of the idler ID and the viscous heater VH, the size of the engine unit including the engine 16 is not very large, the idler ID and the viscous heater VH do not need individual pulleys, drive shafts, electromagnetic clutches and the like, the automobile heating system does not increase the number of parts of the engine unit significantly. Therefore, the engine unit including the engine 16 and the automobile heating system can be formed in a compact construction, can easily be installed in the engine compartment and can be manufactured at low cost.

Figure 4:
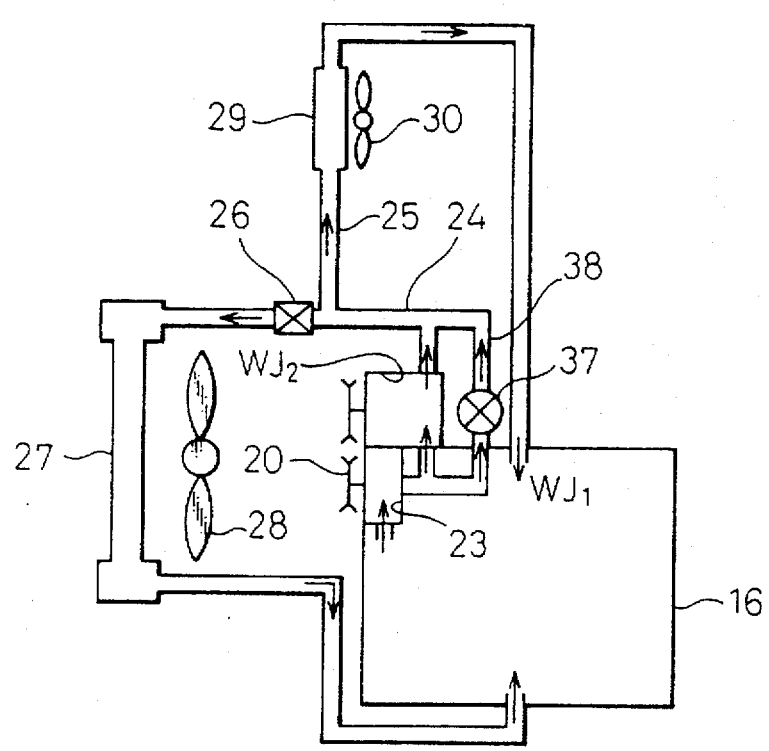
FIG. 4 is a diagrammatic view of the automobile heating system according to a second embodiment of the present invention.

An automobile heating system in a second embodiment according to the present invention shown in FIG. 4 is substantially the same in configuration as the automobile heating system in the first embodiment, except that the former is provided with a bypass conduit 38 bypassing the auxiliary heat receiving chamber WJ2 and provided with an on-off valve 37.

When the cooling water is heated to a temperature beyond a predetermined temperature by the heat generated by the engine 16, the on-off valve is opened and the hot cooling water flows through the bypass conduit 38 bypassing the auxiliary heat receiving chamber WJ2 into the main conduit 24 and the auxiliary conduit 25. Therefore the cooling water experiences a relatively low resistance against its flow. Consequently, the power demand of the water pump can be reduced. The effects of the automobile heating system in the second embodiment are the same as those of the automobile heating system in the first embodiment.

Figure 5:
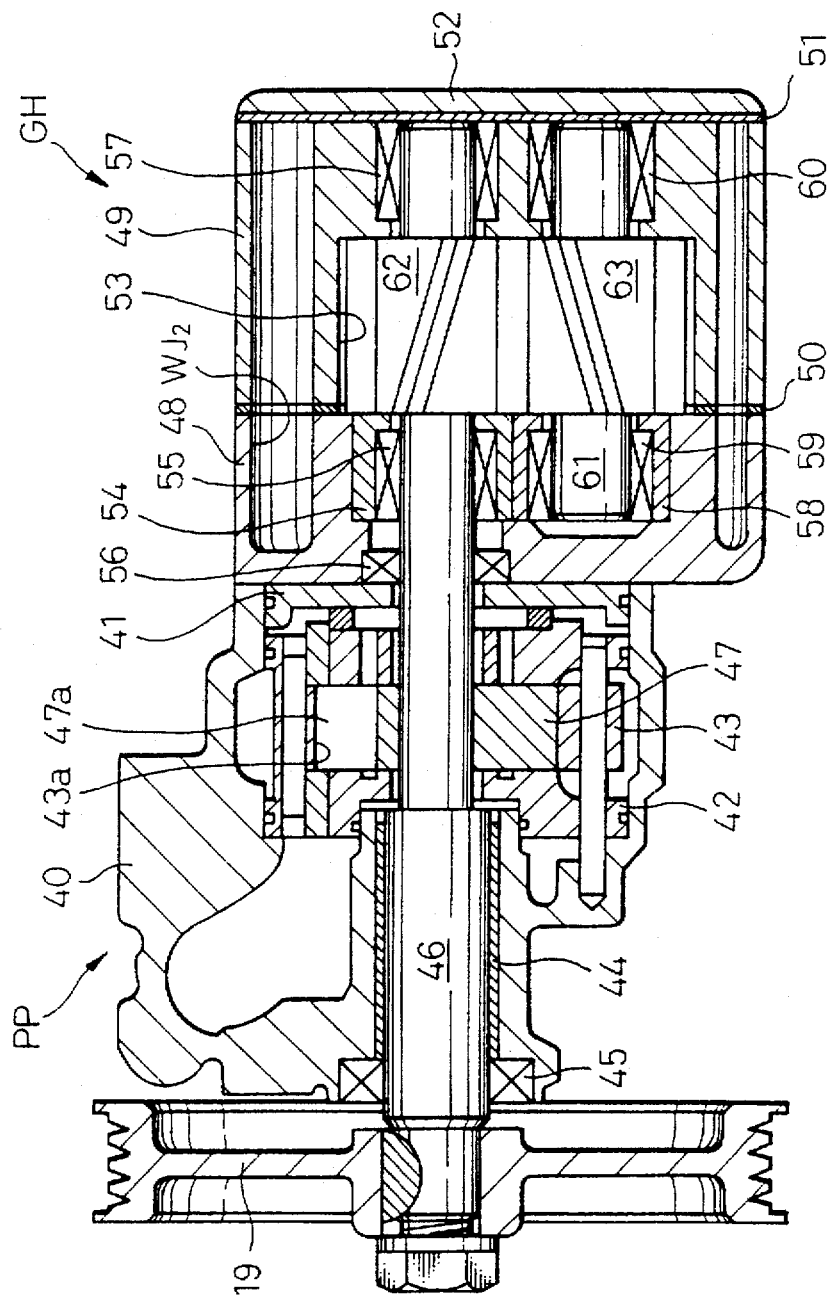
FIG. 5 is a longitudinal sectional view of an essential portion of the automobile heating system according to a third embodiment of the present invention; and, FIG. 6 is a longitudinal sectional view of an essential portion of the automobile heating system according to a fourth embodiment of the present invention.

Referring to FIG. 5 showing an automobile heating system in a third embodiment according to the present invention, a pair of plates 42 and a cam ring 43 provided with a pump chamber 43a are fixedly disposed in a front housing 40 with the cam ring 43 sandwiched between the pair of plates 42, and an end plate 41 is fastened to the rear end of the front housing 40. A drive shaft 46 is supported for rotation in a plain bearing 44 fitted in a bore formed in the front housing 40, and a shaft seal is fitted in the front end of the bore of the front case 40. The power steering pulley 19 (FIG.; 2) is fixedly mounted on the front end of the drive shaft 46. The rear portion of the drive shaft 46 extend through the end plate 41 into a middle housing 48 and a rear housing 49. A vane rotor 47 is fixedly mounted on the drive shaft for rotation in the pump chamber 43a. The vane rotor 47 is provided with a plurality of vanes 47a so as to be able to move in a radial direction.

The middle housing 48 is fastened to the front housing 40 and the end plate 41, the rear housing 49 is fastened to the rear end of the middle housing 48, and a rear end plate 52 is fastened to the rear end of the rear housing 49. Gaskets 50 and 51 are interposed between the middle housing 48 and the rear housing 49 and between the rear housing 49 and the rear end plate 52, respectively. The middle housing 48, the rear housing 49 and the rear end plate 52 constitute a heater housing. A heat generating chamber 53 is defined by a cavity formed in the front end of the rear housing 49 and the flat rear end of the middle housing 48. An auxiliary heat receiving chamber WJ2 is formed in the peripheral walls of the middle housing 48 and the rear housing 49 so as to surround the heat generating chamber 53. An inlet port and an outlet port, not shown, are formed so as to open into the auxiliary heat receiving chamber WJ2.

A sleeve 54 is fitted in a recess formed in the rear end surface of the middle housing 48, a bearing 55 is fitted in the sleeve 54, and a shaft seal 56 is fitted in a recess formed in the front end surface of the middle housing 48. A bearing 57 is fitted in a recess formed in the rear end of the rear housing 49. The rear portion of the drive shaft 46 is supported for rotation in the bearings 55 and 57, and the heater housing is sealed by the shaft seal 56. The drive shaft 46 serves as both a pump driving shaft and a heater driving shaft. A sleeve 58 is fitted contiguously with the sleeve 54 in a recess formed in the rear end surface of the middle housing 48, and a bearing 59 is fitted in the sleeve 58. A bearing 60 is fitted in a recess formed in the rear end of the rear housing 49. A driven shaft 61 is supported for rotation in the bearings 59 and 60. A helical gear 62 is fixedly mounted on a rear portion of the drive shaft 46 for rotation in the heat generating chamber 53, and a helical gear 63 is fixedly mounted on the driven shaft 61 for rotation in the heat generating chamber 53 so as to be in mesh with the helical gear 62. A space between a circumferential surface defining the heat generating chamber 53 and the tooth tips of the driving helical gear 62 and the driven helical gear 63 is filled up with silicone oil.

The power steering pulley 19, the drive shaft 46, the front housing 40, the cam ring 43, the vane rotor 47 and the vane 47a constitute a power steering hydraulic pump PP. The drive shaft, the driven shaft 61, the heat generating chamber 563, the driving helical gear 62, the driven helical gear 63, the silicone oil, and the auxiliary heat receiving camber WJ2 constitute a gear heater GH. Thus, the gear heater GH is combined integrally with the power steering hydraulic pump PP in an assembly, and the drive shaft 46 serves as both the components of the power steering hydraulic pump PP and the gear heater GH.

Figure 2:
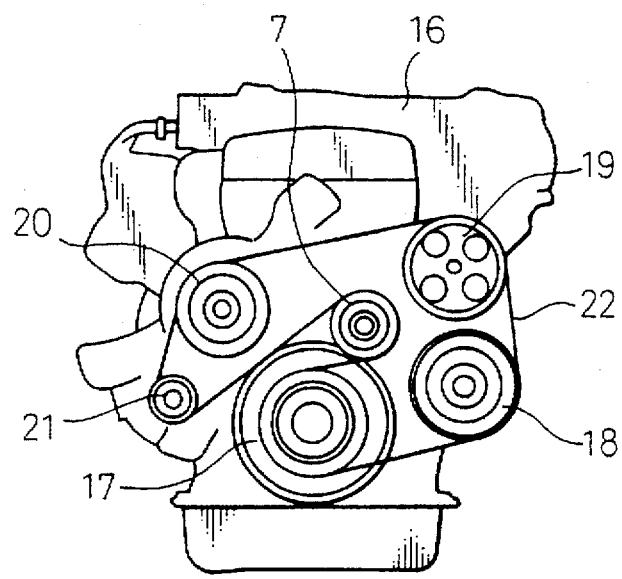
FIG. 2 is a front view of an engine and associated parts connected with the automobile heating system according to a first to fourth embodiment of the present invention.

As shown in FIG. 2, the power steering pulley 19, the air conditioning electromagnetic clutch 18, the idler pulley 14, the water pump pulley 20 and the alternator pulley 21 are driven for rotation through the belt 22 by the crankshaft pulley 17.

In this automobile heating apparatus, the vane rotor 47 rotates for pumping in the pump chamber 43a of the cam ring 43 when the drive shaft 46 of the power steering hydraulic pump PP is driven through the power steering pulley 19 by the engine 16 and, at the same time, the drive shaft 46 of the gear heater GH is driven for rotation. Therefore, the driving helical gear 62 and the driven helical gear 63 rotate in the heat generating chamber 53, whereby the silicone oil is stirred and sheared to generate heat. Accordingly, the automobile heating system is capable of satisfactorily heating the passenger cabin and enables the engine 16 to warmup quickly after the start of the engine 16 even in cold districts.

A small amount of a hydraulic fluid pumped by the power steering hydraulic pump PP leaks through the shaft seal 56 into the bearing 55 of the gear heater GH to lubricate the bearing 55, which improves the durability of the gear heater GH.

Figure 6:
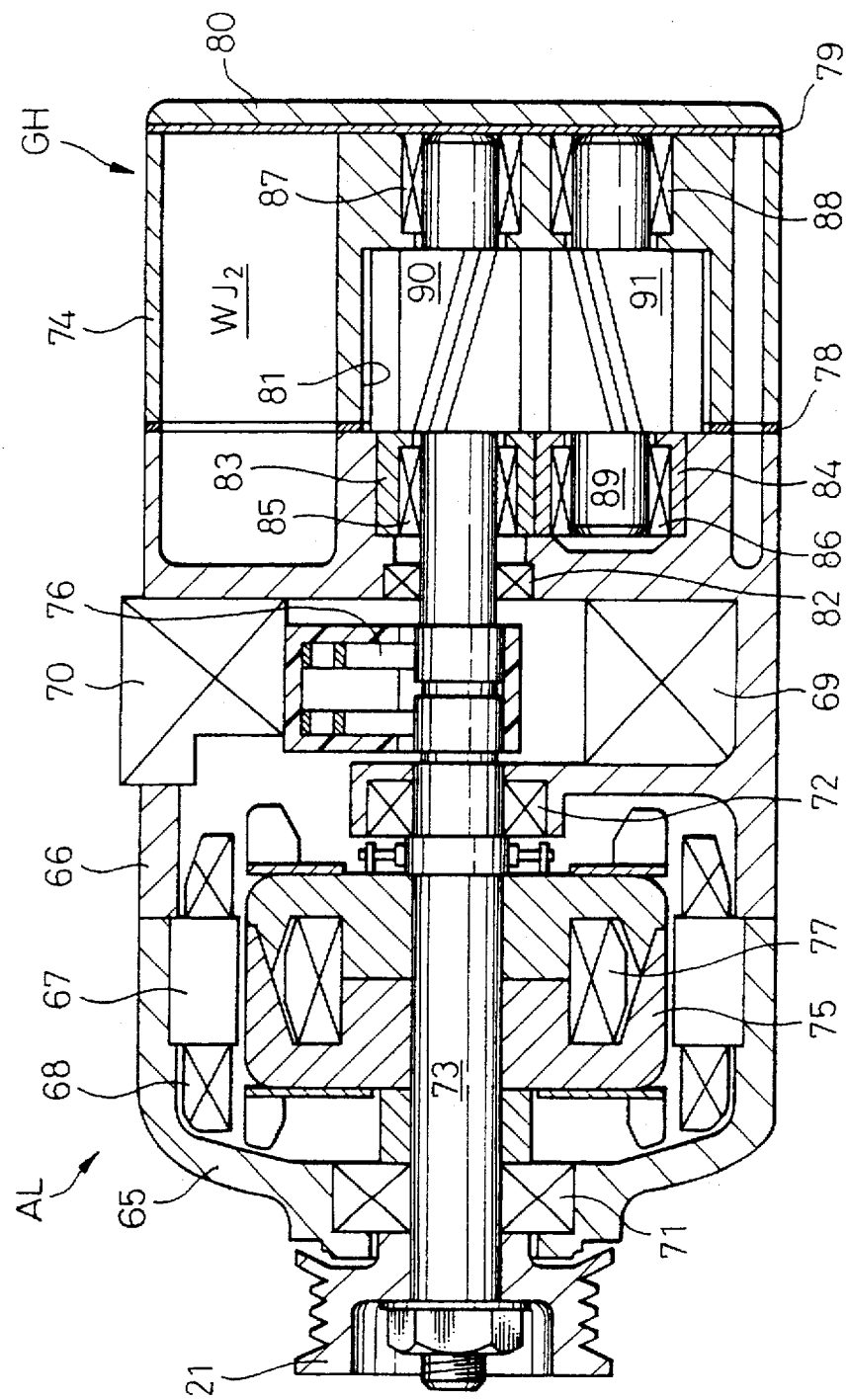

Referring to FIG. 6 showing an automobile heating system in a fourth embodiment according to the present invention, a middle housing 66 is fastened to a front housing 65, a stator core 67 is fastened to the inner surfaces of the front housing 65 and the middle housing 66, and stator coils 68 are wound on the stator core 67. The stator coils 68 are electrically connected to a rectifier 69 and a voltage regulator 70. A drive shaft 73 is supported for rotation in bearings 71 and 72 on the front housing 65 and the middle housing 66. The alternator pulley 21 (FIG. 2) is fixedly mounted on the front end of the drive shaft 73, and a rear portion of the drive shaft 73 extends in a rear housing 74. A rotor core 75 is fixedly mounted on the drive shaft 73, and the rotor core 75 is provided with field coils 77 wound on bobbins. Currents are supplied through brushes 76 to the field coils 77.

The rear housing 74 is fastened to the middle housing 66, and a rear end plate 80 is attached to the rear end of the rear housing 74. Gaskets 78 and 79 are interposed between the middle housing 66 and the rear housing 74 and between the rear housing 74 and the rear end plate 80, respectively. A heat generating chamber 81 and an auxiliary heat receiving chamber WJ2 are formed in the middle housing 66 and the rear housing 74. The middle housing 66 and the rear housing 74 of the fourth embodiment, similarly to those of the third embodiment, are provided with a shaft seal 82, sleeves 83 and 84, and bearings 85 to 88. The rear portion of the drive shaft 73 extending in the middle housing 66 and the rear housing 74 is supported for rotation in the bearings 85 and 87, and a driven shaft 89 is supported for rotation in the bearings 86 and 88. A driving helical gear 90 is fixedly mounted on the rear portion of the drive shaft 73, and a driven helical gear 91 is fixedly mounted on the driven shaft 89 so as to be in mesh with the driving helical gear 90.

The alternator pulley 21, the drive shaft 73, the front housing 65, the middle housing 66, the stator core 67, the stator coils 68, the rectifier 69, the voltage regulator 70, the rotor core 75, the brushes 76, the field coil 75 and such constitute an alternator AL. The middle housing 66, the rear housing 74, the drive shaft 73, the driven shaft 89, the heat generating chamber 81, the driving helical gear 90, the driven helical gear 91, the silicone oil, the auxiliary heat receiving chamber WJ2 and such constitute a gear heater GH. The drive shaft 73 and the middle housing 66 serve as the components of both the alternator AL and the gear heater GH. The fourth embodiment is similar in other respects to the third embodiment.

In this automobile heating apparatus, when the drive shaft 73 of the alternator AL is driven through the alternator pulley 21 by the engine 16, the rotor core 75 provided with the field coils 77 rotates inside the arrangement of the stator coils 68 to generate electricity and, at the same time, since the drive shaft 73 serves also as the drive shaft of the gear heater GH, the driving helical gear 90 and the driven helical gear 91 are rotated to generate heat. Accordingly, the automobile heating system is capable of satisfactorily heating the passenger cabin and enables the engine 16 to warmup quickly after the start of the engine 16 even in cold districts.

Since the drive shaft 73 of the automobile heating system rotates at a high rotating speed, the heating effect of the automobile heating system is higher than that of the automobile heating system in the third embodiment. The automobile heating system according to the fourth embodiment is similar in other functions and effects to that in the third embodiment.

The circuit arrangement of the third and the fourth embodiment may be either that shown in FIG. 3 or that shown in FIG. 4.

In a modification, the positional relation between the steering hydraulic pump PP and the alternator AL, and the corresponding gear heaters GH relative to the pulleys 19 and 21 may be reversed, respectively.

In modifications of the first to the fourth embodiment, the auxiliary machine and the gear heater GH may be provided with separate drive shafts, respectively, and the separate drive shafts may be juxtaposed and driven by gears or the like for synchronous operation.

What we claim is:

1. An automobile heating system to be used in combination with an engine comprising:

an engine housing provided with a main heat receiving chamber formed therein;

an auxiliary machine for the automobile, provided with a machine housing, and a drive shaft having a pulley mounted thereon to receive a drive power from said engine of the automobile, said auxiliary machine including at least one of an automotive idler, a power steering system of said automobile, and an automotive alternator;

a radiator for said engine;

a liquid conduit for permitting a heat exchanging liquid medium to flow through said engine housing and said radiator, said liquid conduit fluidly connecting said main heat receiving chamber of said engine housing to said radiator;

a thermostat provided in said liquid conduit to control opening and closing of said conduit;

a heater core for receiving heat from the liquid medium during circulation of said liquid medium through a medium passage passing through said main heat receiving chamber, said liquid conduit, the radiator and the heater core; and wherein a separate auxiliary heat source is mounted on said engine housing and comprises:

a heater housing means defining therein a heat generating chamber containing therein a given amount of viscous fluid, and an auxiliary heat receiving chamber contiguous with said heat generating chamber and permitting said heat exchanging liquid medium to flow therethrough; and a heater drive shaft rotatably supported on said heater housing means, and rotating so as to urge the viscous fluid contained in said heat generating chamber to generate heat to be supplied to said heat exchanging liquid medium flowing through said auxiliary heat receiving chamber, said auxiliary machine and said auxiliary heat source being integrally formed to have such a construction that said drive shaft of said auxiliary machine and said heater drive shaft are formed as a single common shaft.

2. An automobile heating system according to claim 1, wherein said machine housing of said auxiliary machine and said heater housing are formed as an integral housing.

3. An automobile heating system according to claim 1, wherein said auxiliary heat source has a means for adjustably varying heat generating performance thereof.

4. An automobile heating system according to claim 3, wherein said means for adjustably varying heat generating performance comprises a control chamber means defining a variable volume control chamber fluidly communicated with said heat generating chamber, said variable volume control chamber controlling the given amount of viscous fluid contained in said heat generating chamber.

5. An automobile heating system according to claim 4, wherein said control chamber means comprises a diaphragm member forming a pressure sensitive wall of said variable volume control chamber.

6. An automobile heating system according to claim 1, wherein said heater core is connected to said liquid conduit at a position upstream from said thermostat with respect to the flowing direction of the heat exchanging liquid medium.

7. An automobile heating system according to claim 1, further comprising a bypass fluid passage bypassing said auxiliary heat receiving chamber is connected to said liquid conduit and the heat exchanging liquid medium flows through said bypass passage and through said auxiliary heat receiving chamber.

8. An automobile heating system according to claim 1, wherein said auxiliary machine is an automotive idler.

9. An automobile heating system according to claim 1, wherein said auxiliary machine is a hydraulic pump accommodated in a power steering system of the automobile.

10. An automobile heating system claim 1, wherein said auxiliary machine is a automotive alternator.

11. An automobile heating system claim 1, wherein said heat exchanging liquid medium is a cooling water.

* * * * *